May 3, 1938.  A. E. STACEY, JR  2,116,223
PROCESS FOR CURING FOOD PRODUCTS
Filed Nov. 12, 1934   2 Sheets-Sheet 2
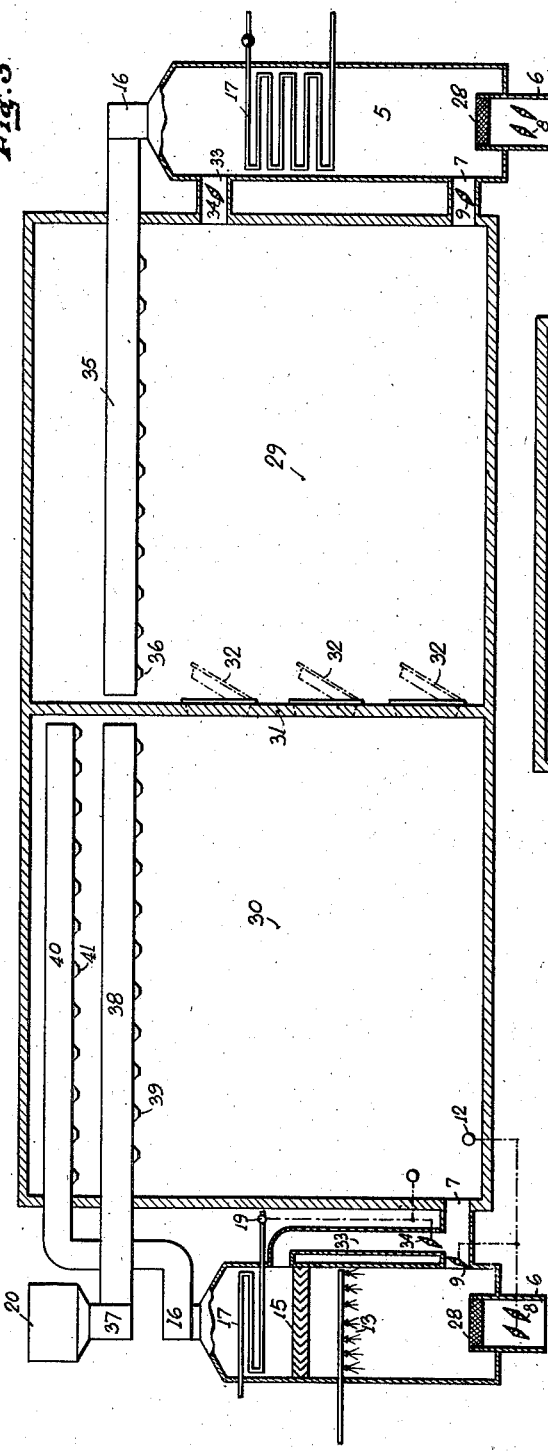
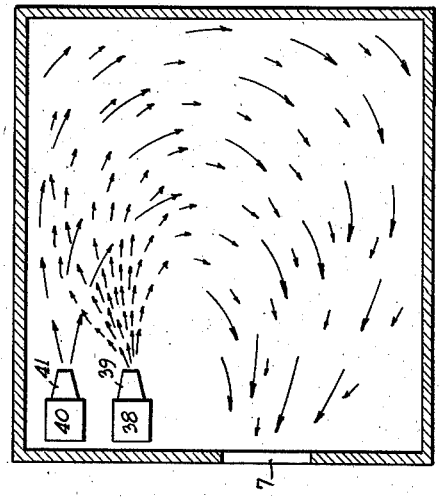
INVENTOR.
ALFRED E. STACEY JR.
BY
ATTORNEY.

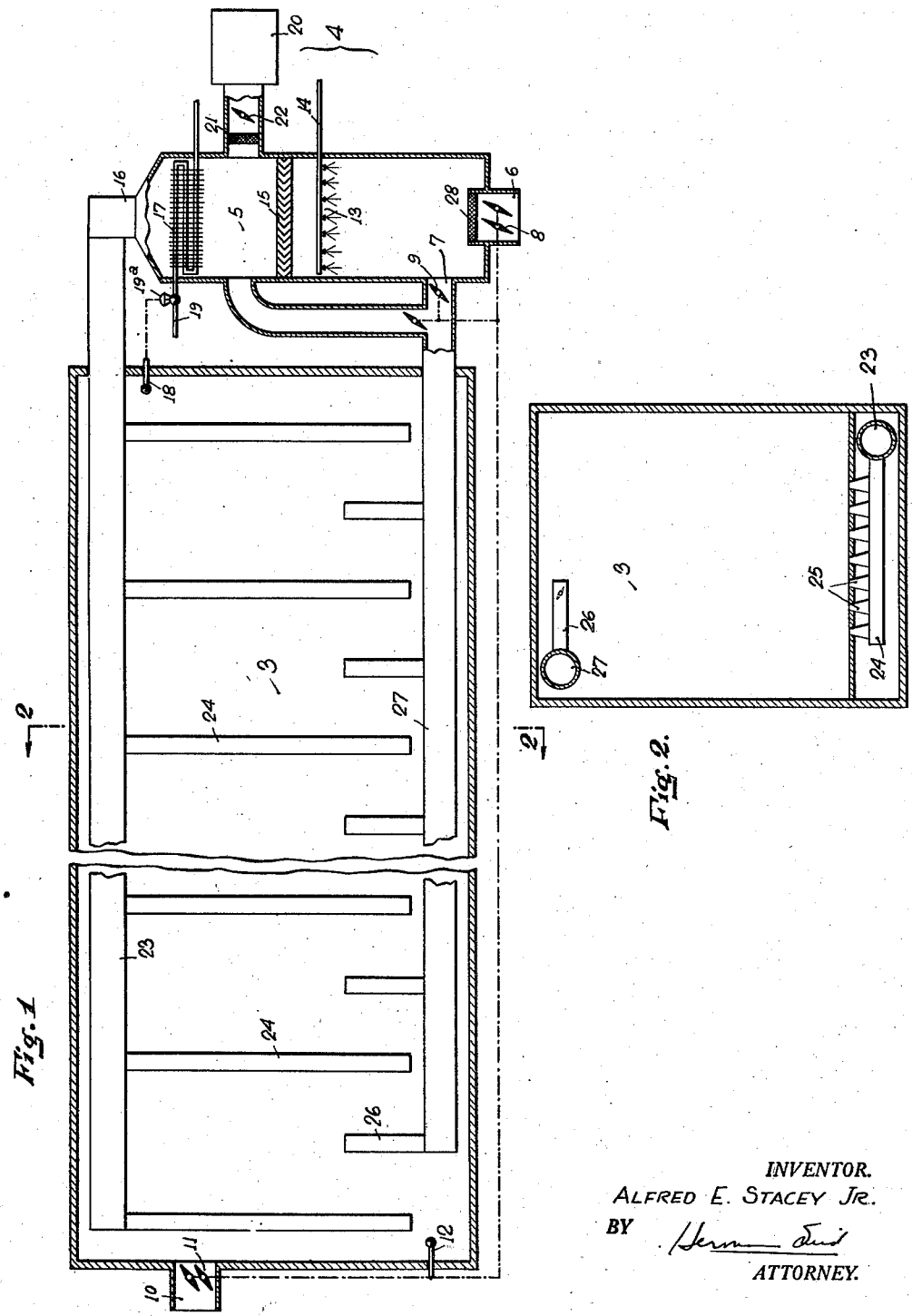

Patented May 3, 1938

2,116,223

UNITED STATES PATENT OFFICE 2,116,223

PROCESS FOR CURING FOOD PRODUCTS

Alfred E. Stacey, Jr., Essex Fells, N. J., assignor by mesne assignments, to Carrier Corporation, Newark, N. J., a corporation of Delaware Application November 12, 1934, Serial No. 752,549

17 Claims. (Cl. 99—229)

This invention relates to methods of and means for smoking and curing food products.

The problem of curing and preserving such perishables as fish, hams, bacon, and other foods adapted to be smoke cured, presents a plurality of problems not encountered in ordinary air conditioning practice either in the industrial or comfort fields. Furthermore, not only is the problem a special one, but particular products require individual treatment differing in many respects from that required by other products. For example, the smoking of salmon calls for producing a juicy, moist condition with flavor and appearance unimpaired, and the removal of moisture minimized. On the other hand, the drying of certain grades of herring and some types of flat fish requires an almost dry product. Similarly, the requirements in treating various grades, types and cuts of meat call for widely varying standards of moisture content, smoked appearance and fiber texture, all of which require special consideration with respect to temperature control, humidity control and smoke production and circulation during the curing process. Furthermore, the curing process in the treatment of many products comprises but one step, which must be coordinated with a drying step as well as a cooling step in order to obtain best results.

The general object of the invention is to provide a system for curing food products, capable of producing desired temperature and humidity conditions in an enclosure and efficiently circulating smoke unimpaired in desired curing qualities in intimate contact with products positioned in the enclosure.

Another object of the invention is to provide a system of curing products in which a drying operation is first carried on to remove excess moisture from the products, followed by a smoke curing step in which the products attain preservative and fixed flavor qualities, and finally, followed by a cooling step wherein the products are reduced in temperature, enabling them properly to be stored or packed for shipment.

Another object of the invention is to provide a system in which food product drying and smoke curing steps may be carried on in a continuous process. In the handling of such products as link frankfurters, where smoking room conditions differ radically from those obtaining during the drying period, the use of a single chamber for carrying out both steps is often impracticable. Applicant therefore provides a first chamber in which the drying operation is initially carried on. The products are then conveyed into a second chamber wherein the smoking process is effected. Drying apparatus for use during the first step in combination with smoke producing and atmospheric conditioning apparatus for use during the second step are provided in combination with the two enclosures, which may be arranged so that produce from one may readily be sent within the other with no substantial interruption in operations between completion of the drying step and the commencement of the smoking step.

Another object of the invention is to provide for introducing smoke into a curing chamber independently of the supply of conditioned air, the smoke and conditioned air being injected into the chamber in the form of a plurality of relatively small streams moving at high velocity.

A feature of the invention provides for controlling the relative humidity in a curing chamber by regulating the entrance of outdoor air to the curing chamber.

Another feature provides for proportioning volumes of return and outdoor air to a curing chamber in combination with means for reheating the air, whereby the relative humidity in the chamber will always be at a prescribed percentage at a predetermined dry bulb temperature.

A further feature provides for adding smoke to a volume of air immediately before the air is discharged into the curing chamber, whereby smoke particles will not be precipitated or the smoke quality impaired by any processing to which the air has previously been subjected.

Another feature provides for discharging smoke into a curing chamber independently of the discharge of conditioned air within the chamber whereby no mixture between the two will occur prior to their circulation in contact with the food products to be treated.

A further feature provides for distributing smoke laden conditioned air at a plurality of points adjacent the floor level of a smoke curing room and removing smoke-spent air from the room at a plurality of points adjacent the ceiling level, and arranging the points of supply and points of removal so that uniform circulation of air will take place throughout the room.

Another feature provides for discharging smoke, air or a combination of the two, into a curing chamber, through a series of high velocity jets, whereby an active air rolling motion will be induced capable of causing effective impingement of the smoke and/or air upon the surfaces of the products to be treated, thereby better and quicker to impart desired color and flavor qualities to and in said products.

Other features providing for simplicity and economy in operation, efficiency in control, and air circulation, and flexibility in adaptation to requirements of different kinds of products, will be apparent from the following written description of the invention to be read, in part, in connection with the accompanying illustrative drawings, in which:

Fig. 1 is a diagrammatic illustration of a curing chamber and apparatus arranged to carry out the invention.

Fig. 2 is a diagrammatic fragmentary section on the line 2—2 of Fig. 1,

Fig. 3 is a diagrammatic plan view partly in section of a drying chamber arranged in combination with a smoke curing chamber, each of the chambers being adapted to be used independently, or in combination with one another, each of the chambers being provided with independent conditioning systems, and Fig. 4 is a diagrammatic elevational section illustrating the method of supplying smoke and conditioned air to the curing chamber shown in Fig. 3.

Considering the drawings, similar designations referring to similar parts, numeral 3 designates a curing chamber provided with access doors, not shown, so that products may be conveyed into the chamber and removed therefrom. An air conditioning system, generally designated by the numeral 4, may be located outside the chamber or within the chamber, and comprises an air conditioner 5 having an outside air inlet 6 and return air inlet 7 equipped with dampers 8 and 9 respectively. Relief opening 10, controlled by dampers 11, permits exhaust from the chamber of an amount of air equivalent to that taken in through inlet 6 under the control of a wet bulb thermostat (or hygrostat) 12. The wet bulb thermostat is suitably positioned inside the chamber and controls dampers 8, 9 and 11. Dampers 8 and 9 operate reciprocally with respect to one another, whereas 8 and 11 operate together. Thus, when the wet bulb temperature within enclosure 3 rises above a desired degree, wet bulb thermostat 12 will cause damper 8 to open wider and damper 9 correspondingly to close. Damper 11 will open with damper 8 to effect the desired relief. As the wet bulb temperature drops, the reverse will take place. Conditioner 5 is equipped with suitable sprays 13 to which cold water or water of any suitable temperature is fed from a suitable outside source through conduit 14. Although sprays are shown, it should be understood that cooling coils may be used, if desired. Also, the cold water or the like fed through conduit 14 may be suitably refrigerated or otherwise reduced in temperature, so that desired cooling may take place in conditioner 5 when required. The eliminators 15 remove entrained moisture from the air in its course to fan 16. A reheater 17, to which steam may be admitted through valve 19a, under the control of dry bulb thermostat 18, located in the enclosure, operates in the usual manner; steam being supplied through conduit 19 from any desired source.

Smoke producer 20 in which hard wood is burned at a proper rate, supplies smoke of desired character to the discharge end of conditioner 5 between eliminators 15 and reheater 17. A suitable filter 21, at the outlet of the smoke producer, and a damper 22 to control the rate of smoke supply are also provided. By admitting the smoke beyond the eliminators, the natural condition of the smoke is preserved and none of the soot and unconsumed particles of carbon and vapors desirable for adequate curing are either precipitated or removed, as would happen if the smoke were introduced prior to the conditioning step. The smoke joins the air entering the fan 16 and is discharged through main distributing duct 23 which feeds to branch distributing ducts 24, located adjacent the floor level. The branch supply ducts may be located below the floor level and have nozzles or outlets 25, as shown in Fig. 2, which discharge the smoke laden air approximately at the floor level. Branch return ducts 26 adjacent the ceiling level, lead into main return duct 27 which constitutes the return connection to the conditioner.

In operation, the food products to be cured will first be subjected to a preliminary drying step. Depending upon outdoor conditions, fresh air will be taken in only if suitable for drying. If the washing apparatus is inoperative, a filter 28 will be employed to clean the incoming air. The dry bulb thermostat 18 will be set for the desired condition and cause the reheater 17 to function to heat the air delivered to distributing ducts 24. The moisture laden air will be relieved to the outer atmosphere through dampers 11.

When the drying process has continued sufficiently to cause a required removal of moisture from the products, the smoke producer will be put in operation and the washing and cooling apparatus started up depending upon the desired condition to be maintained in the curing chamber. Assuming that a temperature of 75–85 degrees is required with a relative humidity between 55 and 65 per cent, the cold water sprays or cooling coils will be put in operation under summer operating conditions. Since the temperature, under summer conditions, will be higher than desired, a minimum of outdoor air would be taken in, whereas, under winter operating conditions, it might be desirable to take in a considerable quantity of air from outdoors. The outdoor air plus return air will have its temperature under summer operating conditions, suitably reduced, and by controlling the sprays, the relative humidity may also suitably be controlled. The air will then proceed through the eliminators, where it will be joined by a metered quantity of smoke and then pass through steam reheaters 17. If the temperature in the room is too low, the steam reheater will be put in operation and raise the temperature of the mixture fed to the fan. The introduction through distributing ducts 24 at the floor level and removal through return ducts 26 at the ceiling level insures an active circulation of the smoke laden air throughout the smoke room area in intimate contact with the products between the floor and ceiling levels. The staggering of the ducts and their location not only at the two levels, but at different points throughout the room, as illustrated in Fig. 1, makes for uniform distribution of air of the same quality throughout every part of the room. The wet bulb thermostat will cause the outdoor air dampen to open wider when the inside wet bulb rises above a desired point. Since the outsdoor air is normally much less than one hundred per cent relative humidity, its introduction will usually cause the excessive relative humidity in the room to be reduced.

After the curing process has been carried on to the point where appearance and flavor qualities have been attained to the desired degree, the smoke producer and conditioning apparatus will be made inoperative and the apparatus then arranged to carry on a cooling step. This may be achieved by controlling the temperature of the sprays so that the temperature of the air delivered to the fan will be at a desired differential below the temperature of the air delivered to the room during the curing step. The relative humidity may be controlled by the reheater so that neither a dry crust will be formed on such products as are susceptible to such formations, nor a film of moisture precipitated. After the cooling process has continued to the point where the temperature of the products is reduced to the desired point and is uniform throughout the products, the apparatus may be entirely shut down and the access doors of the room opened for the removal of the products which are then ready for storage or shipping.

While with the system of Fig. 1, the drying, curing and cooling steps may all be carried on in the one chamber and the conditioning means operated so that desired temperatures, humidities and smoke curing conditions are produced to meet the requirements of the several steps, it is often desirable for efficient operation to utilize separate drying and curing chambers. For example, in the handling of such products as link frankfurters, where smoking room conditions differ radically from those maintained during the drying step, the use of a single chamber slows up operations, due to necessity for cooling down the room subsequent to the drying step, before the smoke curing step can properly be carried on.

In Fig. 3, applicant combines a drying chamber 29 with a smoke curing chamber 30. Although the chambers are shown as an integral structure, separated from one another by a partition 31, having doors 32, to permit access between the chambers, it should be understood that chambers 29 and 30 may be independent structures. In either case, the products from 29, subsequent to the drying step, would immediately be transferred, preferably by belt conveyors or the like, to smoke curing chamber 30. The drying chamber 29 is served by conditioning system including conditioner 5 to which outdoor air may be admitted through air inlet 6 equipped with dampers 8 and return air admitted through inlet 7 equipped with dampers 9. A bypass connection 33, equipped with damper 34, enables air from the chamber to bypass the conditioning apparatus and proceed directly to fan 16. Reheater 17 is provided and operates as in connection with the system of Fig. 1. Although no sprays or humidifying means are shown, they may be provided, but in the absence of sprays or other means for filtering the air, a mechanical filter 28, as in Fig. 1, may be utilized in connection with air inlet 6. Instead of the duct system of Fig. 1, applicant discharges the air into main supply conduit 35. The air from conduit 35 is discharged into the chamber 29 through ejector nozzles 36 in the form of small streams at high velocity. A very rapid circulation of primary air which in turn induces a large secondary circulation of air in the room, assures speedy drying of the products. The primary air and induced secondary air will circulate over and over again in contact with the products at a very rapid rate, the impingement of the air upon and the passage of the air in contact with the products enabling the moisture removal to be conducted at a lower temperature than would otherwise be required and to be concluded in a shorter time. After the drying step, the doors 32 may be opened and the produce conveyed into curing chamber 30. The conditioning apparatus used in connection with chamber 30 is somewhat different than that provided in the system of Fig. 1. Smoke producer chamber 20 is provided with an independent fan 37 and its own distributing system, including supply conduit 38 and ejector nozzles 39. The air conditioning apparatus is, in turn, independent of the smoke producing apparatus, and has, as in Fig. 1, outside air inlet 6 equipped with dampers 8, return air inlet 7, equipped with dampers 9, sprays 13 adapted to be supplied with refrigerant from any desired source, eliminators 15, and reheater 17. A bypass connection 33, equipped with damper 34 enables return air to be used, if desired, for tempering the conditioned air. While the control of outdoor air may be regulated by a wet bulb thermostat 12, as in Fig. 1, the reheater and bypass damper 34 may be under the control of dry bulb thermostat 18. Under summer operating conditions, the bypass damper would open more widely when greater reheating of conditioned air is required, whereas, under winter operating conditions, the thermostat would, instead, control the reheater, admitting steam to coils 17. The fan 16 discharges the conditioned air into an independent distributing conduit 40, the air being discharged in the form of small streams at high velocity through ejector nozzles 41. In Fig. 4 is illustrated the method of circulation employed in chamber 30. The smoke, discharged through nozzles 39 and the conditioned air, discharged through ejector nozzles 41, will circulate rapidly throughout the entire cross-sectional area of the room, and induce a large secondary circulation in the room, so that a swift rolling motion of the air is carried on throughout the curing period. This assures active impingement of the smoke particles on the produce which results in imparting superior color and flavor to the produce. The interpositioning of the nozzles, as illustrated, serves to create a mixture of conditioned air and smoke which is actively impelled throughout the room. The discharge of the air serves to carry along the smoke and prevent "spotty" distribution, i. e., uneven conditions either of smoke impingement on products or distribution of the mixture of smoke and conditioned air throughout every part of the enclosure. Further, the introduction of smoke independently of the air prevents any possibility of loss of smoke ingredients or particles by condensation or precipitation, or detraction from smoke qualities, as often occurs when the some and air are mixed prior to introduction into the room. The number of nozzles, the proportion of smoke ejector nozzles to air ejector nozzles and their interpositioning may be arranged best to suit the particular product handled and the schedule of operations.

While chamber 30 and its auxiliary smoke and conditioning apparatus are shown in combination with the drying chamber 29 and its apparatus, it should be understood that the system of chamber 30 may be used independently as in fact it is, to carry out complete drying, curing and cooling operations. For carrying out the cooling step, the smoke producer would be made inoperative and the conditioning apparatus arranged to provide air at a desired differential, lower in temperature from the condition obtaining in the chamber during the curing step.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

I claim:

1. A method of curing produce, consisting in first subjecting the produce to the action of air free of smoke for the purpose of removing moisture from the produce, controlling the wet bulb temperature of said air by regulating the admission of outdoor air responsive to changes in wet bulb temperature of the air as it is used for drying the produce, then circulating smoke-laden air in contact with the produce to provide desired curing thereof until predetermined characteristics of color and taste are imparted to the produce, and finally cooling the produce by subjecting it to a circulation of air free of smoke, and controlling the relative humidity of the air used in the last step.

2. A method of curing produce, consisting in conditioning air as to temperature and moisture content, removing entrained moisture from the air, then adding a metered quantity of smoke to said air, introducing said air into the curing area substantially at the floor level thereof, and removing the smoke-laden air substantially at the ceiling level of the area after the smoke-laden air has imparted desired characteristics of color and taste to produce positioned in the area.

3. A method according to claim 2 in which the points of supply and the points of removal are staggered with respect to one another.

4. A method of curing food products, consisting in conditioning air as to temperature and relative humidity responsive to changes in condition of air circulated in a curing area, discharging said air substantially free of smoke particles into the curing area under pressure in the form of a plurality of fast-moving streams, contemporaneously supplying smoke-laden air to the area under pressure independently of the first air, and also in the form of a plurality of fast-moving streams, all said streams of air being discharged into the area adjacent the ceiling level thereof, and withdrawing air from the area at a level closer to the floor.

5. A method according to claim 4 in which the conditioned air and smoke, unmixed with each other, are discharged within the curing area in the form of adjacent jets, whereby the conditioned air and smoke will commingle within said curing area and cause precipitation of smoke particles on produce positioned in the area.

6. A method of treating food products, consisting as a first step in introducing conditioned air substantially free of smoke into an area wherein food products are positioned, controlling the temperature and relative humidity of the air so that moisture will be removed from the food products by the air, then utilizing a second area in a second step, said second step consisting in introducing conditioned air substantially free of smoke into said second area in the form of a plurality of streams, and also introducing smoke into the second area in the form of a plurality of independent streams, the conditioned air and smoke being circulated in contact with the food products, the circulation being continued until desired characteristics of color and taste are imparted to the food products, then continuing the process with a third step consisting in discontinuing the supply of smoke to the second area and controlling the temperature and relative humidity of the conditioned air so that the products will be cooled to a temperature proper for storage and shipment, and then removing the products from the second area.

7. A method according to claim 6 in which the first and second areas are adjacent one another whereby the products may be removed from the first area subsequent to the drying step and conveyed directly into the second area, whereby the process may be maintained substantially continuously.

8. A method according to claim 6 in which the air circulated through each of said areas is circulated independently of the circulation of air in the other of said areas.

9. A method according to claim 6 in which the streams of conditioned air and smoke used in the second area are independently supplied to the second area and are independently introduced into the second area.

10. A method of treating food products, consisting in withdrawing air from the conditioned area in which said food products are positioned, withdrawing air from the outdoor atmosphere, conditioning said withdrawn air as to temperature and humidity, regulating the proportion of outdoor air in said volume of conditioned air responsive to changes in wet bulb temperature in the area to be conditioned, introducing said air substantially free of entrained moisture into a mixing chamber, adding smoke to the conditioned air in said mixing chamber, discharging the mixture into the conditioned area at a plurality of points adjacent the floor level and withdrawing air from the conditioned area at a plurality of points at a different level.

11. A method of curing food products consisting in conditioning air as to temperature and relative humidity responsive to changes in condition of air circulated in a curing area, discharging said air substantially free of smoke particles into the curing area in the form of a plurality of fast moving streams, contemporaneously supplying smoke-laden air to the area independently of the first air and also in the form of a plurality of fast moving streams, said smoke-laden and said smoke free air being discharged into the area at one level, and withdrawing air from said area at another level.

12. A method of curing produce, consisting in first subjecting the produce to the action of air free of smoke for the purpose of removing moisture from the produce, controlling the wet bulb temperature of said air by regulating the admission of outdoor air responsive to changes in wet bulb temperature of the air as it is used for drying the produce, then circulating smoke-laden air in contact with the produce to provide desired curing thereof until predetermined characteristics of color and taste are imparted to the produce, and finally cooling the produce by subjecting it to a circulation of air free of smoke, and controlling the relative humidity of the air used in the last step, said produce-treating airs being introduced within the curing area at a first level and being withdrawn from said area at a second level different from said first level.

13. A method of treating food products, consisting in conditioning a volume of air, at least a portion of which is withdrawn from the conditioned area, as to temperature and humidity, regulating the proportion of outdoor air in said volume of conditioned air responsive to changes in wet bulb temperature in the area to be conditioned, introducing said air substantially free of entrained moisture into a mixing chamber, adding smoke to the conditioned air in said mixing chamber, discharging the mixture into the conditioned area at a plurality of points at one level and withdrawing air from the conditioned area at a plurality of points at a different level.

14. A method of curing produce, consisting in first subjecting the produce to the action of air free of smoke for the purpose of removing moisture from the produce, at least a portion of said air being withdrawn from contact with the produce and at least another portion of said air being withdrawn from the outdoor atmosphere in controlled quantities, controlling the wet bulb temperature of the air to the action of which the produce is subjected, then circulating smoke-laden air in contact with the produce to provide desired curing thereof until predetermined characteristics of color and taste are imparted to the produce, and finally cooling the produce by subjecting it to a circulation of air free of smoke, and controlling the relative humidity of the air used in the last step.

15. A method of curing produce, consisting in conditioning air as to temperature and moisture content, then adding a metered quantity of smoke to said air, introducing said air into a curing area, in which the produce is positioned, at a first level, and removing the smoke-laden air from said curing area at a different level after the smoke-laden air has passed in contact with said produce and has acted thereupon to produce in said produce characteristics of color and taste.

16. A method of curing food products, consisting in conditioning air as to temperature and relative humidity, discharging said conditioned air substantially free of smoke particles into the curing area under pressure in the form of a plurality of fast-moving streams, contemporaneously suppling smoke-laden air to the area under pressure independently of the first air and also in the form of a plurality of fast-moving streams, said last-mentioned streams being discharged at points adjacent the points at which said first-mentioned air is discharged, said smoke-free and said smoke-laden airs being discharged into the curing area at one level, and withdrawing said airs from the curing area at another level, the independent discharge into said curing area at high velocity of said smoke-laden and said smoke-free airs serving to prevent condensation of smoke particles to any appreciable extent before said smoke-laden air has circulated in contact with produce in the curing area, whereby the particles condensed from said smoke-laden air are precipitated upon the products to facilitate the curing thereof.

17. A method of treating food products, consisting in withdrawing air from the curing area in which said food products are positioned, withdrawing air from the outdoor atmosphere, conditioning said withdrawn air as to temperature and humidity, regulating the proportion of outdoor air in said volume of conditioned air responsive to changes in wet bulb temperature in the area to be conditioned, adding smoke to said conditioned air to form a mixture, discharging said mixture into the conditioned curing area at a plurality of points proximate one level and withdrawing air from the conditioned curing area at a different level to provide for circulation of said mixture over and in contact with food products within the curing chamber.

ALFRED E. STACEY, Jr.